May 9, 1950  S. W. BAKER  2,506,986
MULTISPEED TRANSMISSION
Filed Jan. 9, 1946  4 Sheets-Sheet 1
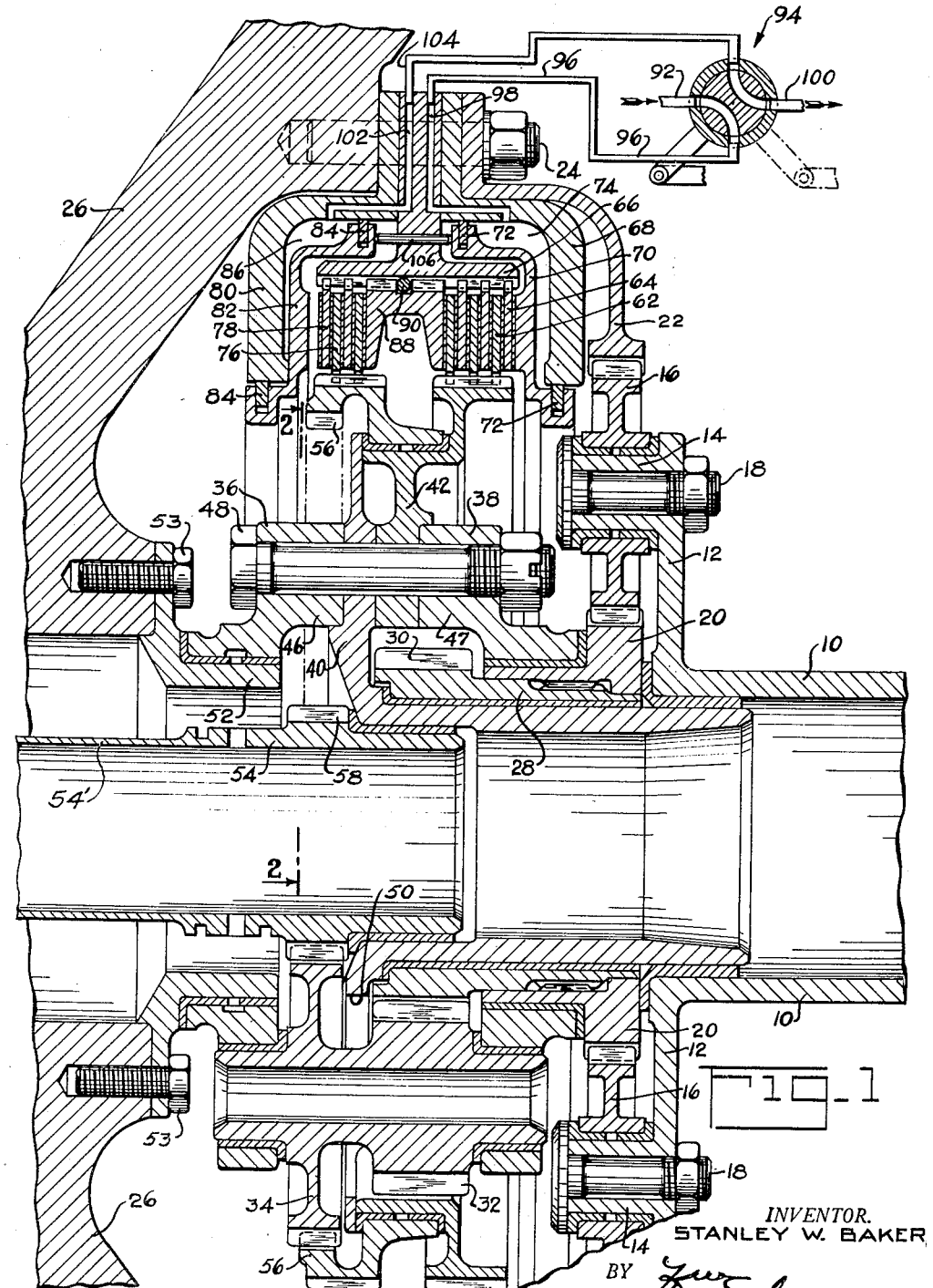
Fig_1.
INVENTOR.
STANLEY W. BAKER
BY
ATTORNEY May 9, 1950 S. W. BAKER 2,506,986
MULTISPEED TRANSMISSION
Filed Jan. 9, 1946 4 Sheets-Sheet 2
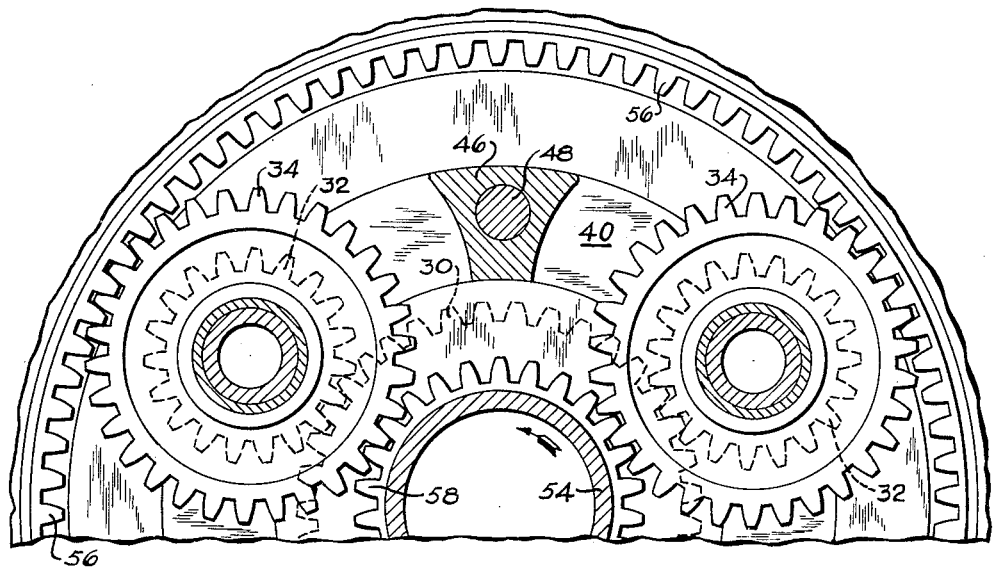
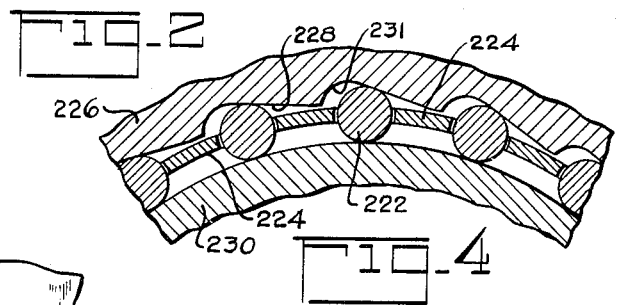
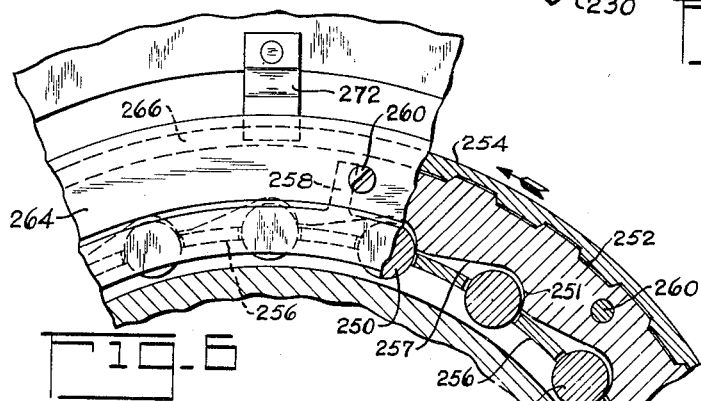
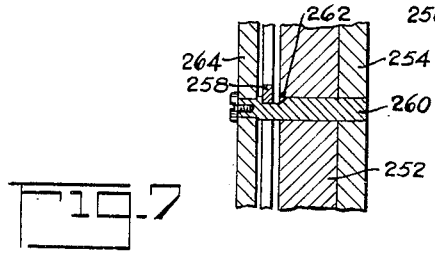
INVENTOR.
STANLEY W. BAKER.
BY
ATTORNEY May 9, 1950     S. W. BAKER     2,506,986
MULTISPEED TRANSMISSION
Filed Jan. 9, 1946     4 Sheets-Sheet 3
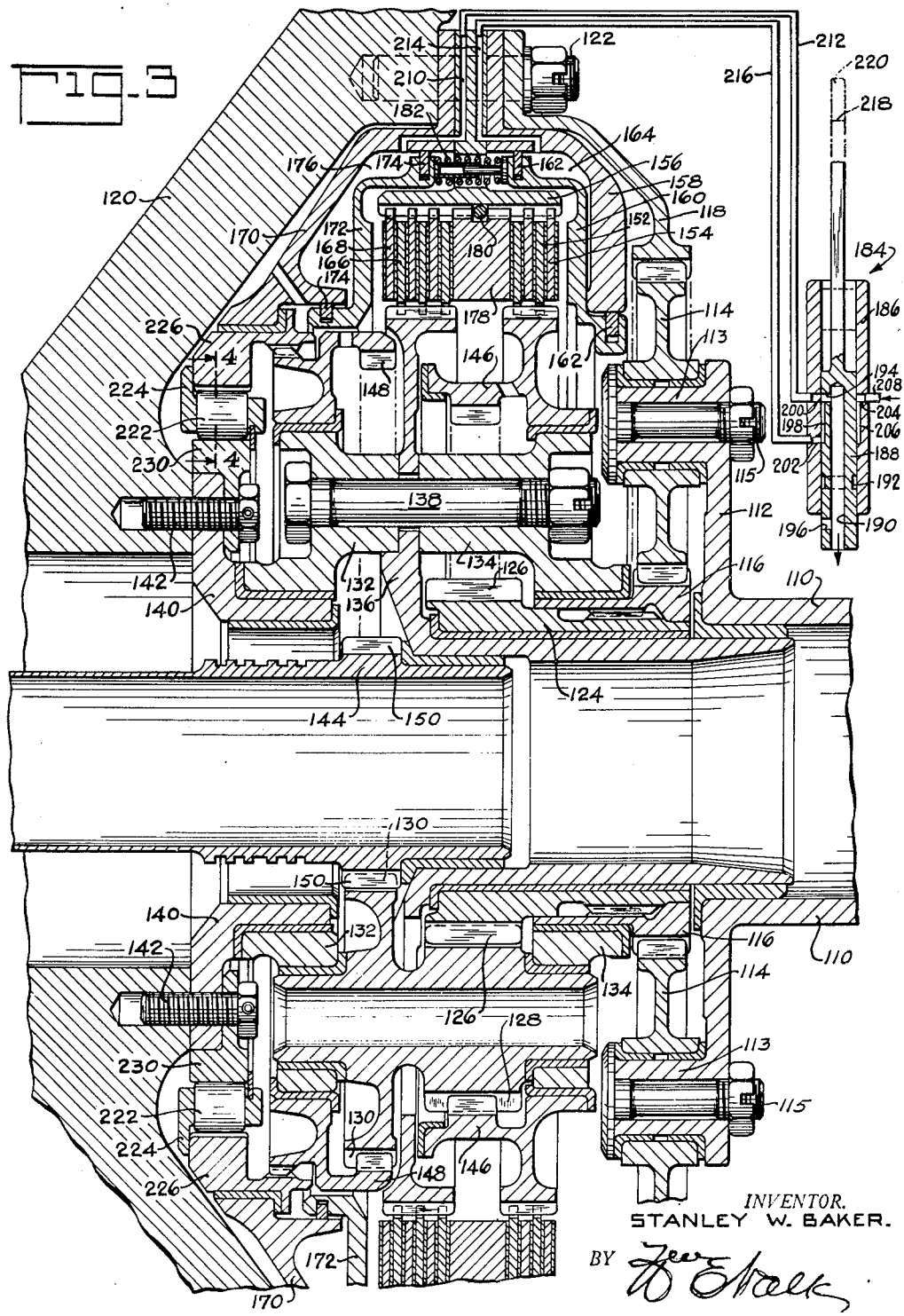
INVENTOR.
STANLEY W. BAKER.
ATTORNEY

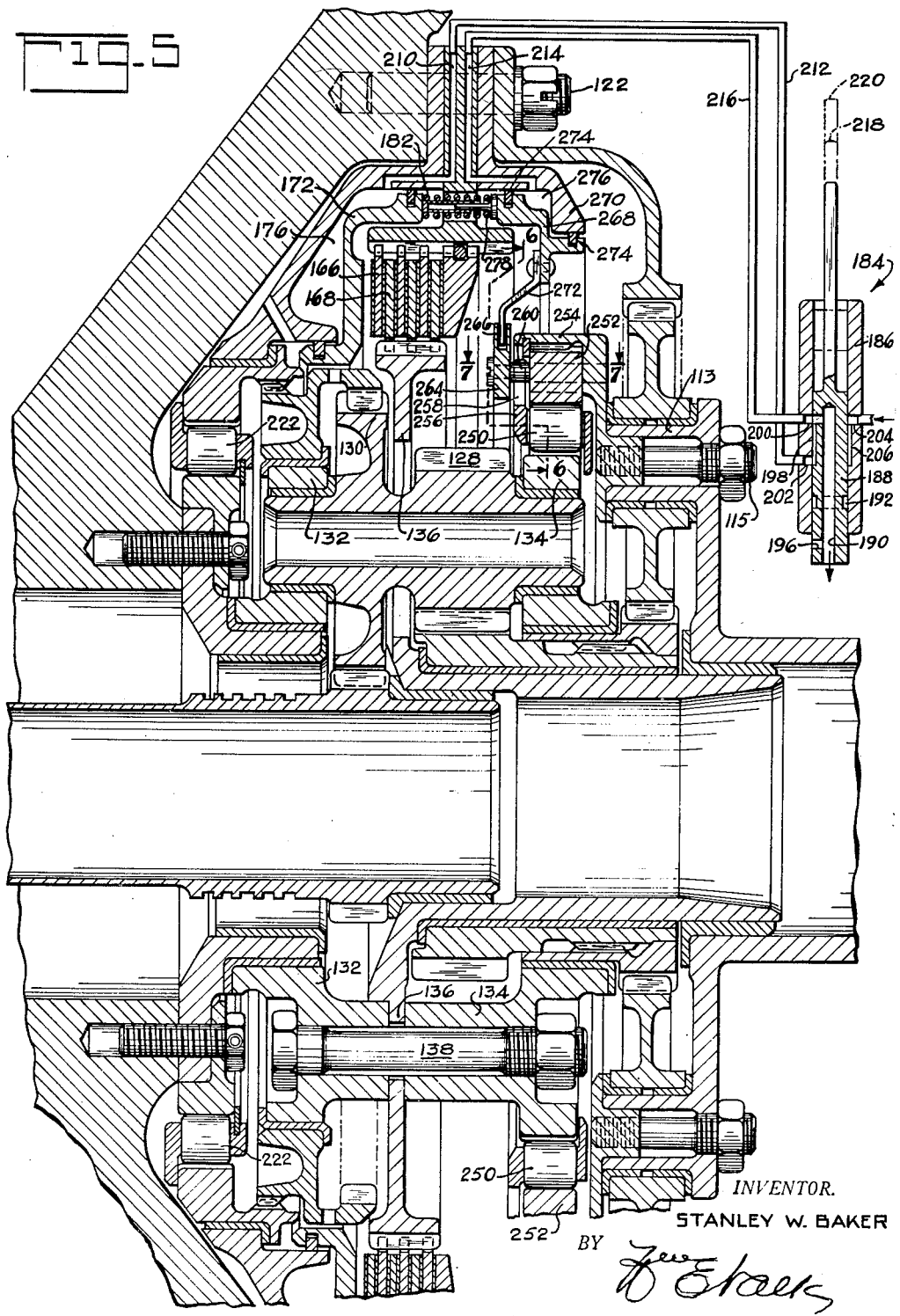

Patented May 9, 1950

2,506,986

UNITED STATES PATENT OFFICE 2,506,986

MULTISPEED TRANSMISSION

Stanley W. Baker, Paramus, N. J., assignor to Wright Aeronautical Corporation, a corporation of New York Application January 9, 1946, Serial No. 640,075

4 Claims. (Cl. 74—764)

This invention relates to multi-speed transmissions and is particularly directed to such transmissions of the planetary gear type.

It is an object of this invention to provide a multi-speed planetary transmission in which the planet carrier and planet pinions rotate at relatively low speeds whereby the planet pinions have only light bearing loads and all gears are in continuous rolling engagement. It is a further object of this invention to provide a multi-speed planetary transmission in which the transmission clutches or brakes all have low engaging speeds and where the hydraulic pressure for controlling the operation of the clutches or brakes is applied in non-rotating chambers.

As illustrated, the transmission has been specifically designed for providing a multi-speed drive between an aircraft engine and a supercharger therefor. Accordingly, it is a further object of this invention to provide a multi-speed planetary transmission occupying relatively little space. However, as will become obvious from the following description, the invention is not limited to this specific application.

Other objects of this invention will become apparent upon reading the annexed detailed description in connection with the drawing in which:

Figure 1 is an axial sectional view through a two-speed embodiment of the invention;

Figure 2 is a sectional view taken along line 2—2 of Figure 1;

Figure 3 is an axial sectional view of a modification of Figure 1 providing three speeds;

Figure 4 is a sectional view taken along line 4—4 of Figure 3;

Figure 5 is an axial sectional view of a modification of Figure 3;

Figure 6 is a sectional view taken along line 6—6 of Figure 5; and

Figure 7 is a sectional view taken along line 7—7 of Figure 5.

Referring first to Figure 1, an engine driven shaft 10 is provided with a radially extending annular flange 12 having a plurality of studs 14 projecting therefrom. Planet pinions 16 are journaled about each of the studs 14 and are held thereon by bolts 18. The planet pinions are disposed in meshing engagement with a sun gear 20 and an internal gear 22 concentric with said sun gear. The internal gear 22 is held against rotation by studs 24 securing the gear to a fixed housing structure 26. With this arrangement, a step-up drive is provided from the input shaft 10 to the sun gear 20. However, as will appear from the following description, the invention is not limited to any particular form of step-up gearing between the input shaft 10 and the gear 20. Also, the internal gear 22, instead of being radially secured to the housing 26, as illustrated, preferably is secured thereto through a conventional resilient connection.

The sun gear 20 is splined to an intermediate shaft 28 having a sun gear 30 disposed in meshing engagement with a plurality of planet pinion gears 32. Each pinion gear 32 is formed integral with a larger pinion gear 34 and these double planet pinions are journaled in a carrier comprising end portions 36 and 38 and intermediate portions 40 and 42. The carrier end portions 36 and 38 are provided with facing bosses 46 and 47 respectively and bolts 48 extend through these bosses and through the intermediate carrier portions for rigidly securing the carrier portions together. The double planet pinions 32 and 34 are journaled in the carrier end portions 36 and 38 and the intermediate carrier portion 40 is provided with openings 50 to clear the planet pinions and the intermediate carrier portion 42 is formed to clear the planet pinions. The carrier end portion 36 is piloted on a drum 52 secured to the housing 26 by bolts 53. Either, or both, the carrier end portion 38 and the intermediate portion 40 pilot the gear 20 and intermediate shaft 28 and the intermediate carrier portion 40 is piloted within the input shaft 10 and pilots an output shaft 54. An internal gear 56 is piloted on the intermediate carrier portion 42 and is disposed in meshing engagement with the larger planet pinions 34. The output shaft 54 is drivably connected to an engine supercharger (not shown) and has a sun gear 58 concentric with the internal gear 56 and meshing with the planet pinions 34. The planet carrier and internal gear 56 are adapted to be releasably clamped to the housing 26 by friction brakes hereinafter described.

With the aforedescribed construction, the planet carrier 36, 38, 40, 42 is supported between the fixed drum 52 and the input shaft 10. Thus, the planet carrier end portion 36 is piloted on the drum 52 and the planet carrier intermediate portion 40 extends inwardly between the sun gears 30 and 58 and is piloted by the input shaft 10. The sun gears 20, 30 and 58 and the internal gear 56 are all piloted by the planet carrier structure and the planet pinions 32 and 34 are carried by the structure. The planet pinions 16 are carried by the input shaft 10 which pilots the planet carrier 36, 38, 40, 42. In this way, the relative positions of all these gears is accurately determined by the input shaft and planet carrier independently of any lateral motion of the input and output shafts. Accordingly, it is possible to have relatively loose fits for the bearings of the sun gears and the internal gear 56 thereby permitting them to adjust themselves to equalize the load between the various planet pinions. As previously mentioned, the fixed internal gear 22 preferably may be provided with a conventional flexible support thereby helping to equalize the load on the pinions 16. Such a flexible support is illustrated in Patent No. 2,407,699. Also, the output shaft 54 preferably is made flexible by providing it with a relatively thin wall construction 54′ whereby the sun gear 58 can follow any lateral motion of its associated planetary gear train independently of any lateral motion of the supercharger impeller (not shown) to which the shaft 54 is drivably connected.

The friction brake for the planet carrier 36, 38, 40, 42 comprises a plurality of annular frictionally engageable plates 62 and 64 alternately disposed and respectively splined to the rim of the carrier member 42 and to a drum 66 secured to the housing 26 by the bolts 24. An annular member 68 is also secured to the housing 26 by the bolts 24 and a piston 70 has seal rings 72 cooperating with the member 68 to provide a sealed annular chamber 74 relative to which the piston 70 is axially slidable.

The friction brake for the internal gear 56 comprises a plurality of annular frictionally engageable plates 76 and 78 alternately disposed and respectively splined to the rim of the gear 56 and to the drum 66. An annular member 80 is also secured to the housing 26 by the bolts 24 and a piston 82 has seal rings 84 cooperating with the member 80 to provide a sealed annular chamber 86 relative to which the piston 82 is axially slidable. A plate 88 is disposed between the set of frictionally engageable plates 62, 64 and the set of frictionally engageable plates 76, 78 and is held against axial movement along the drum 66 by a lock wire 90.

Fluid under pressure is adapted to be supplied to the annular chamber 74 or 86 from a conduit 92 under the control of a valve 94. In the position illustrated, fluid under pressure is supplied to the chamber 74 against the piston 70 via conduit 96 and passage 98 thereby frictionally clamping the plates 62 and 64 together to lock the pinion carrier 36, 38, 40, 42 against rotation. At the same time, the chamber 86 is in communication with a drain conduit 100 through passage 102 and conduit 104. When the valve 94 is moved to its dotted line position, fluid under pressure is admitted to the chamber 86 against piston 82 to lock the friction plates 76 and 78 together thereby preventing rotation of the internal gear 56. A pin 106 is disposed between the pistons 70 and 82 to insure disengagement of either friction brake before the other is applied.

With this construction, when fluid pressure is supplied to the chamber 74 to clamp friction plates 62 and 64 together, the planet carrier 36, 38, 40, 42 is held stationary and the double planet pinions 32, 34 provide a step-up drive ratio from the intermediate shaft 28 to the output shaft 54. At the same time the friction plates 76 and 78 are disengaged and therefore the internal gear 56 is free to rotate. When the friction plates 76 and 78 are engaged and the friction plates 62 and 64 are disengaged, the planet carrier is freed for rotation but the internal gear 56 is now locked against rotation. The planet carrier now rotates and the planet pinions 32, 34 provide a second, but smaller, step-up drive ratio from the intermediate shaft 28 to the output shaft 54. In the high speed ratio, the planet carrier 38 is held stationary so that there are no centrifugal forces on the planet pinion bearings while, in the low speed ratio, the planet carrier only rotates at approximately one and one half times the speed of the input shaft 10, whereby the centrifugal forces on the planet pinions are relatively low.

The modification of Figures 3 and 4 is quite similar to that of Figure 1 except an intermediate speed ratio has been added. In this modification, an input shaft 110 has an annular flange 112 having a plurality of studs 113 projecting therefrom and a plurality of planet pinions 114 are journaled about the studs 113 and are held thereon by bolts 115. The planet pinions 114 are disposed in meshing engagement between a sun gear 116 and an internal gear 118. The internal gear 118 is rigidly secured to the housing 120 by studs 122 thereby providing a step-up drive from the input shaft 110 to the sun gear 116 similar to the initial step-up drive in Figure 1.

The sun gear 116 is splined to an intermediate shaft 124 which is provided with a sun gear 126 meshing with a plurality of planet pinion gears 128. The pinion gears 128 are each formed integral with a larger pinion 130 and these double planet pinions are journaled in a carrier comprising end portions 132 and 134 and an intermediate portion 136 all clamped together by bolts 138. The carrier end portion 132 is piloted on a drum 140 secured to the housing 120 by bolts 142 and the carrier end portion 134 pilots the gear 116. The intermediate carrier portion 136 is piloted by the input shaft 110 and pilots the intermediate shaft 124 and an output shaft 144. The planet carrier 132, 134, 136 is similar to the corresponding planet carrier of Figure 1. An internal gear 146, piloted on the planet carrier, is disposed in meshing engagement with the smaller planet pinions 128 and an internal gear 148, also piloted on the planet carrier, is disposed in meshing engagement with the large planet pinion gears 130. The output shaft 144 has a sun gear 150 meshing with the large planet pinion gears 130.

The internal gear 146 is adapted to be clamped to the housing 120 by a friction brake. This friction brake comprises a plurality of annular frictionally engageable plates 152 and 154 alternately disposed and respectively splined to the rim of the gear 146 and to a drum 156 secured to the housing 120 by the studs 122. An annular member 158 is also secured to the housing 120 by the studs 122 and a piston 160 has seal rings 162 cooperating with the annular member 158 to provide a sealed annular chamber 164 relative to which the piston 160 is slidable.

The planet carrier 132, 134, 136 is also adapted to be clamped to the housing 120 by a friction brake. This friction brake comprises a plurality of annular frictionally engageable plates 166 and 168 alternately disposed and respectively splined to the rim of the carrier portion 136 and to the rigid drum 156. An annular member 170 is also secured to the housing 120 by the studs 122 and a piston 172 has sealed rings 174 cooperating with the annular member 170 to provide a sealed annular chamber 176 relative to which the piston 172 is slidable. A stop plate 178 disposed between the frictionally engageable plates 152 and 154 and the frictionally engageable plates 166 and 168 is held against axial movement relative to the drum 156 by a lock wire 180. Also, a plurality of circumferentially spaced springs 182 extend through openings in a radial flange on the drum 156 to urge the pistons 160 and 172 away from each other to their disengaged positions.

A valve 184 is provided for controlling the application of fluid pressure to the annular chambers 164 and 176. The valve 184 comprises a sleeve 186 and a plug 188 slidable therein. The plug 188 is provided with a central drain passage 190, annular groove 192, and radial holes 194 and 196 communicating with the central passage 190. In addition, the plug 188 is provided with a longitudinal groove 198 extending from the radial passage 194 and having a length sufficient to straddle radial passages 200 and 202 in the sleeve 186. The sleeve 186 is also provided with a radial passage 204 opening into a longitudinally extending internal groove 206 disposed opposite the radial passages 200 and 202 and having a length substantially equal to the axial spacing of these radial passages. A source of fluid pressure is transmitted to the radial sleeve passage 204 through a conduit 208. The radial sleeve passage 200 is in communication with the annular chamber 176 via a passage 210 and a conduit 212 and the radial sleeve passage 202 is in communication with the annular chamber 164 via a passage 214 and a conduit 216.

With the valve plug 188 in the position illustrated in Figure 2, the longitudinal groove 198 straddles both radial passages 200 and 202 whereby both annular chambers 164 and 176 are connected to the drain passage 190 and both friction brakes are disengaged. Assuming counterclockwise rotation of the input shaft, as viewed in Figure 4, then the planet carrier 132, 134, 136 will rotate counterclockwise and the internal gear 148 will also tend to rotate counterclockwise. Counterclockwise rotation of the internal gear 148 is prevented by one-way brake rollers 222 whereupon the transmission provides a low step-up drive ratio from the intermediate shaft 124 to the output shaft 144.

The one-way brake rollers 222 are disposed in a cage 224 and the internal gear 148 is splined to a cam member 226 having cam surfaces 228. The rollers 222 are disposed between the cam surfaces 228 and a cylindrical drum 230 secured to the housing 120 by the bolts 142 whereby the rollers 222 permit clockwise rotation of the internal gear 148 but prevent counterclockwise rotation of this gear as viewed in Figure 4.

When the valve plug 188 is moved upwardly to its mid position, as indicated by the dotted lines at 218, the annular chamber 176 remains in communication with the drain passage 190 but the source of fluid pressure in conduit 208 is now transmitted to the chamber 164 via annular groove 192, conduit 216 and passage 214. The friction plates 152 and 154 are thereby clamped together to lock the internal gear 146 against rotation whereupon the transmission provides an intermediate step-up drive ratio from the shaft 124 to the output shaft 144. The internal gear 148 and cam member 226 now rotate clockwise, as viewed in Figures 3 and 4, so that the one-way brake rollers 222 are ineffective or disengaged. The rollers 222 rotate clockwise with the cam member 226 whereupon the rollers are held radially outwardly in the pockets 231 at the end of their associated cam surfaces 228 by the centrifugal force acting on the rollers. In this way, there is no contact of the rollers with the stationary drum when the rollers are disengaged.

If the valve plug 188 is shifted down back to its full line position, both friction brakes are again disengaged whereupon the internal gear 148 and the cam member 226 decelerate. During this deceleration, the inertia of the rollers 222 and their cage 224 will tend to cause the rollers to move clockwise ahead of the cam member 226 (as viewed in Figure 4) but the centrifugal forces acting on the rollers will hold the rollers in their pockets 231 out of contact with the drum 230 until the speed of the cam member 226 reaches a low value. When the speed of the cam member 226, and therefore the centrifugal force acting on the rollers, reaches some low value, the inertia of the rollers and their cage will be sufficient to cause them to move clockwise (as viewed in Figure 4) relative to the cam member 226 into contact between the cam surfaces 228 and the outer cylindrical surface on the drum 230. Thus, no springs or other means are needed to move the rollers into position for engagement. As soon as the direction of rotation of the cam member 226 tends to reverse, the rollers 222 engage to prevent such reverse rotation. Accordingly, the rollers 222 engage substantially without shock and there is no frictional drag on the rollers except for a small time interval prior to their engagement.

When the valve plug 188 is moved to its extreme upper position, indicated by the dotted lines at 220, the chamber 164 is connected to the drain passage 190 via passage 196, conduit 216 and passage 214. At the same time, the chamber 176 is placed in communication with the fluid pressure supply conduit 208 via the annular groove 192, conduit 212 and passage 210. As a result, the friction plates 166 and 168 are clamped together thereby locking the planet carrier 132, 134, 136 against rotation. The transmission now provides a high step-up drive ratio from the intermediate shaft 124 to the output shaft 144. In this speed ratio, as in the intermediate speed ratio, the internal gear 148 rotates clockwise, as viewed in Figures 3 and 4, and therefore the one-way brake rollers 222 are ineffective.

The constructions of Figures 1 and 3 are quite similar. Thus, in Figure 1, a friction brake is provided for holding a planet carrier stationary at which time the double planet pinions provide a step-up drive ratio. In addition, in Figure 1 a second friction brake is provided for holding stationary an internal gear meshing with the larger of the double planet pinion gears thereby providing a second but smaller step-up drive ratio. Figure 3 is similar except a one-way brake 222 has replaced this second friction brake. Obviously, a one-way brake could be substituted in Figure 1 for the second friction brake comprising the plates 76 and 78. In addition, in Figure 3 a friction brake is provided for holding stationary an internal gear meshing with the smaller of the double planet pinion gears thereby providing an additional or intermediate step-up drive ratio.

Figures 5 to 7 illustrate a modification of Figure 3 in which the intermediate speed ratio is provided by a one-way clutch instead of a friction brake. These modifications are otherwise identical and like parts are indicated by like reference numerals.

In Figures 5 to 7 instead of providing an internal gear in mesh with the smaller planet pinions 128 together with a brake selectively engageable with the internal gear, a one-way clutch comprising rollers 250 is provided between the planet carrier portion 134 and a cam member 252. The cam member 252 is splined to the rim of a plate 254 secured to the studs 113 by bolts 115. The rollers 250 are mounted in a cage 256 and are disposed between the outer cylindrical surface on the planet carrier portion 134 and the internal cam surfaces 257 on the cam member 252. Accordingly, the centrifugal force acting on the rollers 250 holds the rollers in their pockets 251 out of contact with the planet carrier portion 134.

The arrangement is such that when the friction brake plates 166 and 168 are released, the planet carrier 132, 134, 136 starts to rotate in the same direction as the input shaft 110, namely counterclockwise as viewed in Figure 6, and the one-way clutch rollers 250 restrain the planet carrier against rotation at a speed greater than that of the input shaft 110. Accordingly, when the friction brake plates 166 and 168 are disengaged, the one-way clutch rollers 250 provide a step-up drive ratio from the intermediate shaft 124 to the output shaft 144 which speed ratio is intermediate that provided by engagement of the friction brake plates 166 and 168 and that provided by engagement with one-way brake comprising the rollers 222.

With this construction, it is necessary that means be provided to render the one-way clutch rollers 250 inoperative to prevent rotation of the planet carrier 132, 134, 136 at a speed in excess of that of the input shaft 110, otherwise the one-way brake 222 could never be rendered effective. To this end, the cage 256 for the rollers 250 is provided with a plurality of radially extending fingers 258. In addition, a plurality of plungers 260 are slidably disposed in the cam member 252. The plungers 260 are each provided with inclined surfaces 262 which are so disposed relative to the roller cage fingers 258 that upon axial movement of the plungers to the left in Figure 5, the inclined surfaces 262 effect counterclockwise rotation of the roller cage 256 (Figure 6) relative to the cam member 252, thereby moving the rollers into contact between the cam surfaces 257 and the cooperating outer surface of the planet carrier portion 134.

The outer end of each plunger 260 is secured to an annular plate 264 which is provided with a groove 266 about its periphery. A piston 268, slidably disposed relative to a fixed annular member 270, is provided with fingers 272 extending into the annular groove 266. The piston 268 is provided with seal rings 274 cooperating with the annular member 270 to provide a sealed chamber 276 corresponding to the sealed chamber 164 of Figure 2. A spring 278 serves to urge the pistons 172 and 268 away from each other as in Figure 2.

When the chamber 176 is relieved of fluid pressure and fluid pressure is supplied to the chamber 276, piston 268 and annular plate 264 are moved to the left, from their position illustrated in Figure 5, thereby pulling the plungers 260 to the left and moving the rollers 250 into contact between the cam surfaces 257 and the cooperating cylindrical surface on the planet carrier member 134. At the same time, since the chamber 176 is relieved of any fluid pressure, the friction brake plates 166 and 168 are disengaged so that the planet carrier 132, 134, 136 is free to rotate. Then, with the input shaft rotating counterclockwise, as viewed in Figure 6, the planet carrier will rotate counterclockwise until its speed tends to exceed that of the input shaft whereupon the one-way clutch rollers 250 engage to prevent the planet carrier from exceeding the speed of the input shaft and the double planet pinions 128, 130 provide a step-up drive ratio between the intermediate shaft 124 and the output shaft 144.

If the annular chamber 276 is now relieved of fluid pressure, the spring 182 acting against the piston 268 will return the plungers 260 to their retractive positions thereby freeing the roller cage fingers 258. Then, if fluid pressure is supplied to the chamber 176 to engage the brake plates 166 and 168, the planet carrier 132, 134, 136 will be held against rotation whereupon the rotation of the cam member 252 will return the rollers 250 and their cage 256 to the position illustrated in Figure 5. The centrifugal force acting on the rollers 250 helps to return the rollers to their pockets 251. At the same time, with said planet carrier held stationary, the double planet pinions 128, 130 provide a step-up drive ratio from the intermediate shaft 124 to the output shaft 144, as in Figure 2, this latter ratio being larger than the step-up ratio provided when the one-way clutch rollers 250 are engaged. If the chamber 176 is now also relieved of fluid pressure, then both the friction brake and the one-way clutch rollers 250 will be disengaged and the one-way brake rollers 222 will engage to provide a step-up drive ratio between the intermediate shaft 124 and the output shaft 144 as in Figure 2, this latter ratio being smaller than either of the other two ratios.

In order to disengage the one-way clutch rollers 250, it is not only necesary to relieve the chamber 276 of fluid pressure in order to retract the plungers 260 but it is also necessary to engage the brake plates 166 and 168 to force the rollers 250 out from their wedged positions between the cam surfaces 257 and the cooperating cylindrical surface on the planet carrier portion 134. To this end, in Figure 5, the valve 184 is connected in such a manner that the chamber 176 is connected to the radial passage 202 instead of, as in Figure 2, to the radial passage 200 and the chamber 276 is connected to the radial passage 200.

With this connection of the valve 184, when the valve plug 188 is in its lowermost position, as illustrated in Figure 5, both annular chambers 176 and 276 are connected to the valve drain passage 190. Accordingly, the one-way brake rollers 222 engage to prevent counterclockwise rotation of the internal gear 148 thereby providing the transmission with its low step-up speed drive ratio.

When the valve plug 188 is raised to its mid position, indicated at 218, the annular chamber 276 remains in communication with the drain passage 190 but fluid pressure is now transmitted to the annular chamber 176 via annular groove 192, conduit 212 and passage 210. Accordingly, the friction plates 166 and 168 are clamped together thereby locking the planet carrier 132, 134, 136 against rotation. The transmission now provides a high step-up drive ratio from the shaft 124 to the shaft 144.

When the valve plug 188 is raised to its uppermost position, indicated at 220, the annular chamber 176 is connected to the drain passage 190 via passage 196, conduit 212 and passage 210 thereby disengaging the brake plates 166 and 168 and freeing the planet carrier 132, 134, 136. At the same time, fluid pressure is supplied to the chamber 276 via annular grooves 192, conduit 216 and passage 214. Therefore, the piston 268 and plate 266 are moved to the left from their position illustrated in Figure 5 whereupon the inclined surfaces 262 on the plungers 260 rotate the roller cage 256 counterclockwise, as viewed in Figure 6. Thus, the rollers 250 are moved into contact between the cam surfaces 257 and the outer cylindrical surface of the planet carrier portion 134. The planet carrier rotates in a counterclockwise direction and accelerates until its speed tends to exceed that of the input shaft whereupon the rollers 250 engage to prevent any further increase in speed of the planet carrier relative to the input shaft. The transmission then provides an intermediate step-up drive ratio from the shaft 124 to the output shaft 144. In both this intermediate speed ratio and in the high speed ratio of the transmision, the internal gear 148 rotates clockwise whereupon the one-way brake rollers 222 are ineffective.

In order to shift back into the low speed ratio from the intermediate speed ratio of the transmission, it is first necessary to move the valve through its mid position whereupon the friction plates 166 and 168 are engaged to place the transmission in its high speed ratio thereby forcing the one-way clutch rollers 250 out from their engaged positions to their inoperative positions as previously described. The centrifugal force acting on the rollers 250 helps to move the rollers outwardly into the pockets 251 from their engaged positions.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In a transmission, an input shaft, an output shaft, a pair of concentric sun gears each drivably connected to one of said shafts, a plurality of pairs of planet pinions, the planet pinions of each pair being rotationally rigid relative to each other with one planet pinion of each pair disposed in meshing engagement with one of said sun gears and with the other planet pinion disposed in meshing engagement with the other of said sun gears, an internal gear concentric with said sun gears and meshing with one of the planet pinions of each pair, a carrier for said planet pinions, a first brake engageable to hold said carrier stationary, a second brake automatically engageable to prevent rotation of said internal gear in one direction, and a clutch automatically engageable to prevent rotation of said carrier at a speed in excess of and in the same direction as that of said input shaft, the drive connection between said input shaft and its associated sun gear being such that the ratio of the speed of said sun gear to the speed of said input shaft is greater than unity.

2. In a transmission, an input shaft, an output shaft, a pair of concentric sun gears each drivably connected to one of said shafts, a plurality of pairs of planet pinions, the planet pinions of each pair being rotationally rigid relative to each other with one planet pinion of each pair disposed in meshing engagement with one of said sun gears and with the other planet pinion disposed in meshing engagement with the other of said sun gears, an internal gear concentric with said sun gears and meshing with one of the planet pinions of each pair, a carrier for said planet pinions, a pair of brakes, one of said brakes being engageable to prevent rotation of said carrier in at least one direction and the other of said brakes being engageable to prevent rotation of said internal gear in at least one direction, and a clutch engageable to prevent rotation of said carrier at a speed in excess of that of said input shaft, the drive connection between said input shaft and its associated sun gear being such that the ratio of the speed of said sun gear to the speed of said input shaft is greater than unity, said carrier having a multi-part construction including first, second and third annular parts rigidly secured together and having annular bearing engagement with said internal gear, said first and second annular carrier parts being disposed axially beyond opposite ends of said pairs of pinions to provide an annular bearing support for the two ends of said carrier and said third part being disposed intermediate said first and second parts and extending between said sun gears so that one of said sun gears has annular bearing engagement externally about said third part and the other of said sun gears has annular internal bearing engagement with said third part.

3. In a transmission: a pair of co-axial sun gears; a plurality of pairs of planet pinions, the planet pinions of each pair being rotationally rigid relative to each other with one planet pinion of each pair being disposed in meshing engagement with one of said sun gears and with the other planet pinion of each pair being disposed in meshing engagement with the other of said sun gears; an internal gear co-axial with said sun gears and meshing with one of the planet pinions of each pair of said pinions; a carrier for said planet pinions; and a pair of brakes, one of said brakes being engageable to prevent rotation of said carrier in at least one direction and the other of said brakes being engageable to prevent rotation of said internal gear in at least one direction, said carrier having a multi-part construction including first, second and third annular parts rigidly secured together and having annular bearing engagement with said internal gear, said first and second annular carrier parts being disposed axially beyond opposite ends of said pairs of pinions to provide an annular bearing support for the two ends of said carrier and said third carrier part being disposed intermediate said first and second parts and extending between said sun gears so that one of said sun gears has annular external bearing engagement with said third part and the other of said sun gears has annular internal bearing engagement with said third part.

4. In a transmission, an input shaft, an output shaft, a pair of co-axial sun gears each drivably connected to one of said shafts, a plurality of pairs of planet pinions, the planet pinions of each pair being rotationally rigid relative to each other with one planet pinion of each pair disposed in meshing engagement with one of said sun gears and with the other planet pinion disposed in meshing engagement with the other of said sun gears, a pair of internal gears co-axial with said sun gears and each meshing with one of the planet pinions of each pair, a carrier for said planet pinions, a first brake engageable to prevent rotation of said carrier, a second brake engageable to prevent rotation of one of said internal gears, and a third brake engageable to prevent rotation of the other of said internal gears, said carrier having a multi-part construction including first, second and third annular parts rigidly secured together and having annular bearing engagement with said internal gears, said first and second annular carrier parts being disposed axially beyond opposite ends of said pairs of pinions to provide an annular bearing support for the two ends of said carrier and said third carrier part being disposed intermediate said first and second parts and extending between said sun gears so that one of said sun gears has annular external bearing engagement with said third part and the other of said sun gears has annular internal bearing engagement with said third part.

STANLEY W. BAKER.

REFERENCES CITED

The following references are of record in the file of this patent:

UNITED STATES PATENTS

| Number | Name | Date |
| --- | --- | --- |
| 888,750 | Salter | May 26, 1908 |
| 1,360,693 | Silvius | Nov. 30, 1920 |
| 1,814,095 | Saki | July 14, 1931 |
| 1,814,096 | Saki | July 14, 1931 |
| 2,038,985 | Browne | Apr. 28, 1936 |
| 2,049,798 | Booth | Aug. 4, 1936 |
| 2,099,675 | Cutler | Nov. 23, 1937 |
| 2,139,986 | Towns et al. | Dec. 13, 1938 |
| 2,221,190 | Hunter | Nov. 12, 1940 |
| 2,251,625 | Hale | Aug. 5, 1941 |
| 2,408,008 | Tipton | Sept. 24, 1946 |

FOREIGN PATENTS

| Number | Country | Date |
| --- | --- | --- |
| 328,472 | France | Jan. 17, 1903 |